3,082,068
PROCESS FOR THE RECOVERY OF METALS FROM SCRAPS BY A SULFIDIZING AND OXIDIZING TREATMENT
Leo Schlecht, Ludwigshafen (Rhine), Georg Trageser, Ludwigshafen (Rhine)-Oppau, and Rudolf Staeger, Friedelsheim, Pfalz, Germany, assignors to Badische Anilin- & Soda-Fabrik Aktiengesellschaft, Ludwigshafen (Rhine), Germany
No Drawing. Filed Mar. 21, 1958, Ser. No. 722,851
12 Claims. (Cl. 23—203)

The present invention relates to an improved method for the recovery of metal contents of scraps, more specifically to the recovery of the metal contents of scraps containing as the main component one or several metals of the iron group and, in addition, one or several of the metals aluminum, silicon, titanium, niobium, chromium, molybdenum, or manganese.

The U.S. patent specification No. 2,086,881 describes a process for the working up of scrap containing nickel and iron by melting the scrap with sulfide-forming substances in suitable proportions and treating the matte thus obtained with carbon monoxide under pressure and at elevated temperature. The method is advantageous in many respects: It is fast; the separation of nickel and copper or nickel and iron is complete with practically no losses; and the nickel obtained is pure and of excellent quality. By this method there can be obtained in a simple way pure nickel or pure iron of high quality even from scrap with a high percentage of impurities. However, in working up such scraps there is frequently obtained a matte, which reacts only slowly, and in some cases in insufficient quantities, with carbon monoxide, even at a high pressure and a high temperature. Experiments showed that the slower reactivity is to be attributed to impurities which are detrimental to the process even if the quantities present are minute. A surprising discovery was for instance that a nickel-copper matte containing only 1% of metallic silicon may, under normal reaction conditions, be nearly incapable of being worked up. Other substances, too, such as aluminum, manganese, chromium, or carbon in the form of carbide interfere with the reaction to a greater or lesser degree, if present as alloy components in the matte.

We have now found that this method of working up scraps containing at least one metal of the iron group and a metal of the group consisting of copper, aluminum, silicon, titanium, niobium, chromium, molybdenum, and manganese, can be considerably improved, if in addition to a sulfidizing treatment the scraps are also subjected to an oxidizing treatment. By this additional purification impurities contained in probably all scrap lots can be slagged and removed from the matte to such an extent that the reactivity with carbon monoxide is no longer impaired.

The additional purification by the oxidizing treatment is not only of advantage when the matte is worked up by way of the carbonyl formation, but also when wet processes are to be used. A particular advantage of this treatment is that alloys that for their content of silicon, chromium or other components are soluble only with difficulty or completely insoluble can be brought into an easily crushable and easily soluble form. The fact that impurities that are baser than iron are simultaneously separated from the alloys by the said oxidizing treatment adds to the ease with which the wet-processing method can be carried out in comparison to the usual carbonyl forming method. The oxidizing treatment may be carried out by any known method, for instance by bessemerizing the molten scrap with air, oxygen, or other oxidizing gases, by passing these gases over the melt, or by melting the scrap with suitable oxides or substances containing such oxides, e.g. iron ores, roasted pyrites, nickel oxide, copper oxide, and the like. The oxidizing treatment may be carried out before the sulfide-forming substances used for the sulfidizing treatment are added, either in the melt or at a lower temperature. When working in the melt the oxidizing treatment takes place preferably during or after the sulfidizing treatment.

In order to free the matte from troublesome substances as far as possible, it may be advisable to use pure substances in the sulfidizing process. Elemental sulfur which can easily be obtained in a sufficiently pure form, is particularly suitable. It is introduced into the melt in a finely ground state by some carrier gas or as vapor, e.g. through the jets in the converter. In this way contamination of the melt by the many impurities contained in natural sulfides can be avoided. This is of particular advantage if the oxidizing treatment precedes the sulfidizing treatment.

In general, only the metals forming difficultly reducible oxides, such as chromium, silicon, aluminum, and titanium, are oxidized, wholly or partly, preferably down to a content below 1% of the matte's weight. This also applies to the separation of carbon contained in the form of carbide. In other cases, for example when the raw material contains only small amounts of the metals of the iron group as compared with the other components, the raw material can be oxidized all the way through and then treated under reducing conditions at elevated temperature so that only the metal contents to be recovered are reduced, whereas the metals forming difficultly reducible oxides remain as oxides and can be separated from the fraction containing the sulfides. For example, by limiting the amount of reducing agent or using a reduction temperature at which the difficultly reducible oxides of the undesirable elements are not reduced, it is possible to ensure that only the metals of the iron group pass into the sulfide-containing fraction, leaving the other components such as chromium oxide, aluminum oxide, and silicic acid. By the said limitation of the reducing agent it is usually also possible to leave a considerable part of the iron (which in some cases is not desired) as oxide with the difficultly reducible oxides and thus to separate it from the other metals of the iron group, such as nickel and cobalt. The working up of the said raw materials by the process according to the present invention is usually facilitated by working in the presence of copper, for example by using copper sulfide as the sulfidic addition.

The oxidizing and sulfidizing processes can be carried out in an economical manner in a one-step operation by simultaneously introducing into the molten scrap for example pyrites and roasted pyrites. For the simultaneous sulfidizing and oxidizing treatment of the melt, oxides of sulfur such as sulfur dioxide or sulfur trioxide, may be employed instead of the sulfides usually employed for sulfidizing, the oxygen introduced in the form of sulfur oxide effecting the desired purification. Depending on the amount of the troublesome impurities it may be necessary to increase the oxidizing action by a treatment with oxygen or other oxidizing gases prior to the treatment with sulfur dioxide. In other cases it is preferable to increase the sulfidizing action as compared with the oxidizing action by adding elemental sulfur to the sulfur dioxide gas. By suitable application of all the said processes so much of the impurities can be removed that the matte obtained reacts much more rapidly and in many cases with better yields than a matte which has not been subjected to this treatment. Instead of the sulfur oxides as such, their salts, e.g. calcium sulfite, calcium sulfate, nickel sulfate, or copper sulfate, can also be used.

It has been found that the said sulfur oxides react with the alloys in such a way that the sulfur content is combined with the more noble alloy components, especially the copper, as sulfide sulfur, whereas the oxygen fraction effects an oxidation of the impurities, which are usually baser, and of the iron. When using sulfates or sulfites, the metal contained therein slags if it is baser than the metals of the alloys to be treated. Thus for example when using calcium sulfate for sulfidizing and refining alloys, calcium silicate is formed in addition to metal sulfide and metal oxide, which are also slagged. If, however, a sulfate of a nobler metal is used, for example nickel sulfate, copper sulfate or cobalt sulfate, this metal is not slagged but reduced and effects in this way a further refining of the alloys at the same time. When mixed sulfates are used, the content of baser metals is slagged, as described, while the nobler metals pass into the matte and in this way are simultaneously recovered and refined.

In order to carry out the said reactions it is necessary to bring the alloys into close contact at high temperature with the oxides of sulfur. Below the melting temperatures a sufficient reaction speed and consequently the avoidance of waste of gas is only possible in cases in which the metal is in finely divided form, for example as grinding dust, it being preferable to mix the highly heated metal dust intimately with the gas or salt. In most cases, however, it is preferable to melt the metals before the reaction and if necessary to superheat the melt. The admixture of sulfur oxides in the form of their salts can be carried out in any known manner, for example by pouring the liquid metal in a ladle onto a rammed-down or otherwise securely held layer of sulfates, or by pressing the sulfates to briquettes and introducing these into the melt. In so far as sulfur oxides are used in gaseous form, it is preferable in order to achieve a sufficient reaction speed to blow these into the melt, for example through the jets in the converter. In many cases it is recommended to blow the finely divided salts into the melt by means of gaseous sulfur oxides or another gas, especially a gas containing free oxygen.

The process according to this invention permits the bringing to reaction of very different alloys with sulfur oxides and salts of sulfur oxides, especially sulfates or sulfites of very different kinds. It is a special advantage of the process that it can be combined in a simple way with other processes by using the sulfur oxides, either as such or in the form of salts, together with elemental sulfur and/or sulfides. Thus for example pyrites may be introduced into the melt in addition to calcium sulfate. In this way the sulfur of the pyrites acts to form sulfide, while by an addition of calcium sulfate the iron content of the pyrites is slagged at the same time. When the alloy contains only small amounts of impurities, this combination offers special advantages. By this admixture of sulfur, pyrites or other reducing substances, the refining action of the sulfur oxides can be graduated. By the addition of oxygen, air or metal oxides, for example by blowing basic nickel sulfate into the melt by means of oxygen, the said refining action may be increased. The sulfidizing and oxidizing effect is obtained in all cases irrespective of whether the individual substances are used simultaneously or in any sequence.

Instead of introducing the sulfur oxides into the reaction zone, they may be allowed to form in the reaction zone from combustible sulfur compounds and oxidizing agents.

In order to use the process under any given conditions it is merely necessary so to correlate the oxygen and sulfur contents of the substances being used to one another that the desired amount of impurities is slagged and the desired amount of sulfur is introduced into the matte.

When working up scraps that besides iron contain cobalt and nickel, the sulfide sulfur content in the scrap is preferably adjusted to between 0.7 and 1 part per 1 part of cobalt to ensure proper binding of cobalt and sulfur. When using a scrap which in addition to cobalt, nickel and/or iron contains copper, e.g. cobalt-copper matte or cobalt-nickel-copper matte, sulfur is preferably added in such quantities as to ensure the formation of the sulfides of cobalt and copper. When treating the products thus sulfidized with carbon monoxide under pressure, copper and cobalt remain in the residue, from where the two metals can be recovered by known methods.

From a raw material containing nickel, cobalt, and iron practically all nickel and iron will volatilize as carbonyls when the ratio of cobalt to sulfur is adjusted as above. If it is desired to prevent part of the iron from volatilizing, some higher sulfur content in the sulfidized raw material is used.

The separation of cobalt from accompanying nickel and/or iron is possible practically without losses to cobalt. Raw materials such as cobalt-containing iron ores that for some unfavorable iron-cobalt ratio could not prior to our invention be processed at all or in an uneconomical manner, can therefore also be handled by the process of our invention.

By this simple method of separating cobalt from nickel and/or iron, ores, concentrates or waste slags can also be processed in an economical manner. These slags are melted down in known manner for example into a nickel-cobalt-iron matte, the ratio of sulfide sulfur to cobalt being adjusted to between 0.7 and 1 to 1. By the subsequent treatment with carbon oxide the cobalt is obtained as enriched cobalt sulfide residue with practically no losses. Due to its high cobalt content the residue can be worked up into cobalt metal or cobalt salt without difficulty.

The following examples will further illustrate this invention, but the invention is not restricted to these examples. The parts are parts by weight.

*Example 1*

It is practically impossible to bring to reaction with hydrochloric acid a fused product which contains 36.5% of nickel and 10.8% of silicon as well as iron and copper. Extensive comminution of this material to increase its reactivity is not possible by reason of its hardness.

If, however, 100 parts of this material are melted in a reverberatory furnace and then oxidized in the fused state by leading thereover air and introducing a waste product containing nickel oxide and iron oxide, so that silicic acid or silicate is formed, and then sulfidizing is effected by the addition of 20 parts of pyrites, the resulting sulfur-containing fused product, after separation of the slag, can readily be comminuted. It now reacts rapidly with hydrochloric acid so that the nickel passes readily and completely into solution. The separation of the copper in the form of copper sulfide takes place when the fused product is dissolved.

*Example 2*

2,000 parts of alloy grindings containing 36% of nickel, 27% of copper, 14% of iron, and 2.8% of silicon, which are not appreciably attacked either by acid or by carbon monoxide, are oxidized, by leading air thereover at a temperature of about 800° C. Then about 500 parts of pyrites and 500 parts of sand are added and the charge melted down and cast into barrels. The slag thus formed can readily be separated from 1,600 parts of sulfur-containing matte. The nickel fraction in the sulfide-containing melt can be volatilized to the extent of about 95% as nickel carbonyl by treatment with carbon monoxide under pressure. The residue obtained by the carbon monoxide treatment and consisting mainly of copper sulfide can be worked up without difficulty to pure copper by blasting and electrolysis. When the said alloy grindings are fused with the said amount of pyrites without previous oxidizing treatment the matte obtained does not form a carbonyl when treated under the said conditions with carbon monoxide.

Example 3

30 parts of steel grindings containing 18% of copper and 8% of nickel are oxidized by heating in air and the resulting oxides melted after the addition of 6 parts of pyrites, 4 parts of carbon as well as fluxes. 14.7 parts of a sulfidic melt are obtained which, contrasted with a melt which has been obtained in the same way except that it has not been treated with air, is unobjectionably soluble in acids.

Example 4

2,000 parts of grindings containing 8.8% of nickel, 1.76% of copper, 36.9% of iron, and 4.54% of cobalt in addition to aluminum, are completely oxidized by leading air thereover and then 1,000 parts of a slag containing nickel and copper, 300 parts of scrap iron, 40 parts of pyrites, and 50 parts of coke are added and the mixture melted down. 1,000 parts of a matte are obtained which contains almost the whole of the nickel, copper, and cobalt content and a part of the iron content of the grindings used as well as of the added slag. The working up of the comminuted melt by the carbonyl method offers no difficulties. A melt obtained in the same way, but without the said oxidation, does not react with carbon monoxide.

Example 5

Sulfur dioxide gas is led into fused Monel metal scrap. The gas is completely absorbed by the melt so that no troublesome odor can be noticed in the gases escaping from the open crucible. The slag obtained is very dark in color because the iron contained in the Monel metal scrap has been slagged by the treatment. The matte obtained contains 9.24% of sulfur and shows good reactivity with carbon monoxide. The matte may also be worked up with acid.

Example 6

2,500 parts of a mixture of scrap are melted down in a rotary drum furnace. The melt contains in each 100 parts, 27.4 parts of nickel, 53.1 parts of iron, 12.4 parts of copper, and also other base components. 725 parts of calcium sulfate in the form of natural anhydrite are blown into the melt by means of air under a pressure of 8 atmospheres after the addition of sand. The slag is very mobile and assumes a very dark color. In this slag there are determined analytically 776 parts of iron and moreover all the other impurities which are baser than iron have passed out from the melt. The sulfide sulfur content of the matte obtained practically agrees with the sulfur content of the calcium sulfate used. By the said treatment there has thus been achieved an excellent refining action simultaneously with a sulfidizing of the metal melt.

Example 7

Fine granular sulfur is blown by means of sulfur dioxide as carrier gas into impure fused Monel metal scrap containing aluminum. The gas is practically completely absorbed by the melt. The nickel-copper matte obtained has especially good reactivity with carbon monoxide. In particular it is superior to a matte which has been obtained by sulfidizing the same Monel metal with elemental sulfur which has been blown into the melt by means of nitrogen as carrier gas. If samples of the two mattes are treated with carbon monoxide under a pressure of 200 atmospheres at 200° C. for 67 hours, the nickel content of the matte sulfidized by means of sulfur dioxide and sulfur is completely volatilized whereas the Monel metal treated only with sulfur only yields 70.5% of its nickel content.

Example 8

3,500 parts of scrap which contains 42.9% of nickel and 23.3% of copper as well as iron and other alloy components is fused and 260 parts of sulfur with a granulation of less than 5 millimeters is blown into the resultant melt by means of a rapid stream of air. 258 parts of sulfur are refound in the resultant matte. In two further identical batches, sulfur amounts of 262 and 258 parts are found in the resultant mattes.

The use of air as carrier gas thus results in no loss of sulfur within the limits of analytical accuracy. This shows that the sulfur dioxide formed as an intermediate product from the sulfur vapor and air has further reacted with the metal. This may be seen from the fact that the iron content of the melt has fallen by the said treatment by about 4.1 parts of iron per 100 parts of copper.

Example 9

4,400 parts of scrapped radio valves which besides nonmetallic impurities contain parts of various metals, mainly lengths of wire about one millimeter in thickness are heated with 1,320 parts of anhydrite in a rotary drum furnace until sintering begins. After adding 2,640 parts of quartz sand, the mixture is melted. When the melt has solidified 1,981 parts of matte can be stripped from 7,169 parts of slag.

The matte contains 66.3% of nickel, 6.1% of iron, 14.7% of copper, and 12.9% of sulfur.

The anhydrite used contains 257 parts of sulfur. Of these 255 parts are found in the matte as sulfide sulfur.

Example 10

3,800 parts of wire scrap (wire thickness from 2 to 10 mm.) are heated with 1,370 parts of anhydrite in a rotary drum furnace until sintering begins. After adding 2,510 parts of quartz sand, the mixture is melted. When the mixture has solidified 2,000 parts of matte with 62.2% of nickel, 24.6% of iron, 2.0% of copper, 0.07% of chromium, and a sulfide sulfur content of 8.92% are obtained. They are separated from the slag.

1.4 parts of chromium is in the matte compared with 193.4 parts of chromium in the slag. Thus, when treating the wire scrap with natural calcium sulfate the chromium content thereof is slagged to the extent of 99.3%. At the same time the rest of the alloy is sulfidized to the point that it can be dressed, by crushing or grinding, for further processing into pure nickel.

Example 11

1,000 parts of coarse Monel scrap are melted with 1,000 parts of ferrous grinding dust, 700 parts of natural anhydrite, and 2,000 parts of slags. The sulfur contained in the anhydrite added will be found as sulfide sulfur in the matte.

Example 12

2,770 parts of grinding dust from several alloys of a high nickel content are mixed with 750 parts of natural calcium sulfate and slowly melted down. 2,280 parts of matte are obtained which contain 42% of nickel, 31% of iron, 20% of copper, and 7% of sulfide sulfur.

From this matte the nickel can be recovered almost completely by treating it with carbon monoxide under pressure. During this treatment samples were taken and tested to establish their reactivity with carbon monoxide under pressure the sample being reacted therewith under identical conditions. The yield of nickel was 7.1% with the pulverulent sample taken at 900° C.;
59.2% with the slightly sintered sample taken at 1,000° C.;
81.0% with the highly sintered sample taken at 1,200° C.

The mixture does not melt and separate into slag and matte until the temperature is above 1,400° C. The samples taken show that the metallic portions of the scrap come to react with the anhydrite to the effect of being activated by the formation of sulfides already at a temperature which is appreciably below the melting point of the alloy.

Example 13

2,890 parts of scrap wire (3 mm. in thickness) of pure nickel copper are melted down with 1,200 parts of anhydrite, 2,600 parts of quartz sand and 200 parts of coke. The matte obtained contains 7% of sulfur. Nickel silicate cannot be detected in the slag.

Example 14

2,500 parts of pure Monel scrap consisting mainly of heavy forgings, are melted with 1,000 parts of anhydrite, 800 parts of quartz sand, and 200 parts of coke. The matte obtained contains 5.44% of sulfide sulfur. Nickel silicate cannot be detected in the slag.

We claim:

1. A process for recovering metal values from scrap metal containing copper and at least one metal selected from the group (1) consisting of iron and nickel and which further contains at least one element selected from the group (2) consisting of aluminum, silicon, titanium, niobium, chromium, and manganese, which comprises melting said scrap, sulfidizing the copper content of the melt to a substantially complete degree while simultaneously oxidizing said elements of group (2) to a substantially complete degree, slagging the resulting oxides, separating the slag from the resulting matte containing copper and the metals of group (1), and treating said matte with carbon monoxide to remove the metals of the group (1) consisting of iron and nickel.

2. A process as defined in claim 1 wherein said simultaneous sulfidization and oxidation are carried out by introducing into said melt elemental sulfur with a gas selected from the group consisting of air, sulfur dioxide and sulfur trioxide.

3. A process as defined in claim 1 wherein said simultaneous sulfidization and oxidation are carried out by introducing a salt containing a sulfur oxide into said melt by means of a carrier gas, said salt being selected from the group consisting of calcium sulfite, calcium sulfate, copper sulfate, and nickel sulfate.

4. A process as defined in claim 1 wherein said simultaneous sulfidization and oxidation are carried out by introducing by means of a carrier gas into said melt a salt containing a sulfur oxide and elemental sulfur.

5. A process for recovering metal values from scrap metal which contains copper and cobalt and at least one metal selected from the group (1) consisting of iron and nickel and which further contains at least one element selected from the group (2) consisting of aluminum, silicon, titanium, niobium, chromium, and manganese, which comprises melting said scrap, sulfidizing the copper content of the melt to a substantially complete degree while simultaneously oxidizing said elements of group (2) to a substantially complete degree, slagging the resulting oxides, separating the slag from the resulting matte containing copper and cobalt and the metals of group (1), and treating said matte with carbon monoxide to remove the metals of the group (1) consisting of iron and nickel.

6. A process as defined in claim 5 wherein said simultaneous sulfidization and oxidation are carried out by introducing into said melt elemental sulfur with a gas selected from the group consisting of air, sulfur dioxide and sulfur trioxide.

7. A process as defined in claim 5 wherein said simultaneous sulfidization and oxidation are carried out by introducing by means of a carrier gas into said melt a salt containing a sulfur oxide, said salt being selected from the group consisting of calcium sulfite, calcium sulfate, copper sulfate and nickel sulfate.

8. A process as defined in claim 5 wherein said simultaneous sulfidization and oxidation are carried out by introducing by means of a carrier gas into said melt a salt containing a sulfur oxide and elemental sulfur.

9. A process for recovering metal values from scrap metal which contains copper, cobalt, nickel, and iron and which further contains at least one element selected from the group consisting of aluminum, silicon, titanium, niobium, chromium, and manganese which comprises: melting said scrap, sulfidizing the copper components of the melt to a substantially complete degree while simultaneously oxidizing said elements selected from the group consisting of aluminum, silicon, titanium, niobium, chromium, and manganese to a substantially complete degree along with a portion of the iron components of the melt, slagging the resultant oxides, separating the slag from the resulting matte containing copper, nickel, and a portion of the iron components of the melt, and treating said matte with carbon monoxide to remove the metals of the group consisting of iron and nickel.

10. A process as defined in claim 9 wherein said simultaneous sulfidization and oxidation are carried out by introducing into said melt elemental sulfur with a gas selected from the group consisting of air, sulfur dioxide and sulfur trioxide.

11. A process as defined in claim 9 wherein said simultaneous sulfidization and oxidation are carried out by introducing by means of a carrier gas into said melt a salt containing a sulfur oxide, said salt being selected from the group consisting of calcium sulfite, calcium sulfate, copper sulfate and nickel sulfate.

12. A process as defined in claim 9 wherein said simultaneous sulfidization and oxidation are carried out by introducing by means of a carrier gas into said melt a salt containing a sulfur oxide and elemental sulfur.

References Cited in the file of this patent

UNITED STATES PATENTS

| 1,909,762 | Grieb | May 16, 1933 |
| 2,086,881 | Schlecht et al. | July 13, 1937 |
| 2,424,866 | Udy | July 29, 1947 |

FOREIGN PATENTS

| 312,629 | Great Britain | Dec. 30, 1929 |

OTHER REFERENCES

Stoughton et al.: "Engineering Metallurgy," 2nd ed., 1930, pages 95–96 and 260–261.